PROCESS FOR THE PREPARATION OF VANADIUM (CARBO) NITRIDE

Servaas Middelhoek, Arnhem, Netherlands, assignor to N.V. Hollandse Metallurgische Industrie Billiton, Arnhem, Netherlands
No Drawing. Filed Sept. 9, 1970, Ser. No. 70,888
Int. Cl. C01b *21/10*
U.S. Cl. 423—371                                      7 Claims

ABSTRACT OF THE DISCLOSURE

A process for the preparation of vanadium carbonitride and/or vanadium nitride-containing materials, which consists in treating an oxidic vanadium-containing material at high temperature with, in succession, or wholly or partly simultaneously, gaseous hydrocarbons and nitrogen, with or without ammonia.

---

A process for the preparation of vanadium carbonitride and/or vanadium nitride-containing materials, which consists in treating an oxidic vanadium-containing material at high temperature with, in succession, or wholly or partly simultaneously, gaseous hydrocarbons and nitrogen, with or without ammonia.

This invention relates to a process for the preparation of a vanadium carbonitride and/or vanadium nitride-containing material. Such materials constitute suitable additives to molten steel for alloying steel with vanadium and possibly, nitrogen, provided they can be prepared relatively inexpensively.

The invention now provides for a commercially attractive process for the preparation of the above mentioned materials, characterized by the fact that an oxidic, vanadium-containing starting material is converted at high temperature in the presence of, successively, or wholly or partly simultaneously, at least one gaseous hydrocarbon and nitrogen and/or ammonia.

The process according to the invention can be carried out in many ways. The conditions employed may be dictated by the carbon content desired in the final product, which may consist mainly of vanadium carbonitride, mainly of a mixture of vanadium carbonitride and vanadium carbide and/or vanadium nitride, mainly of a mixture of vanadium carbide and vanadium nitride, or essentially of vanadium nitride. If so desired, a final product may be prepared containing free carbon.

The process can be carried out, for example, by first passing the gaseous hydrocarbon (optionally mixed with hydrogen and/or ammonia) over or through the oxide, vanadium-containing material in such a way that the material is converted chiefly to oxycarbides and/or oxycarbonitrides and subsequently passing nitrogen or ammonia, optionally mixed with hydrogen, over or through the material thus converted. This modification is particularly suitable for the preparation of vanadium nitride which is practically free from carbon.

It is also possible to carry out the process of the invention by using a single gas mixture consisting of essentially a hydrocarbon and nitrogen and/or ammonia, to which hydrogen may have been added; in which case, if so desired, the hydrogen content may be reduced in the course of the process. It is also possible to convert the starting material first with a gas containing mainly hydrocarbons to essentially vanadium oxycarbides, after which the material thus converted is made to react with a gas mixture containing hydrocarbons and nitrogen and/or ammonia, to which hydrogen may have been added.

The hydrocarbons used are preferably those with 1–3 carbon atoms. Methane, especially, is most suitable.

The gases and gas mixtures used in the present process need not consist solely of the components referred to above (hydrocarbon, nitrogen, ammonia and hydrogen), but, in addition, may contain other non-interfering constitutents. Thus gas mixtures containing up to 20 percent by volume of CO can be used.

The process in accordance with the invention is preferably carried out at a temperature between 800 and 1250° C., and preferably between 900 and 1100° C. Any prereduction of, for example, $V_2O_5$ to $V_2O_3$ may take place at lower temperatures. Such a prereduction may advantageously be carried out with gases recycled from the main process.

Additionally, it is possible to prepare the oxidic vanadium in situ, together with one or more of the gases involved in the reaction, from a compound unstable at the reaction temperatures used, such as ammonium metavanadate.

The preferred process is that wherein a single gas mixture is used which contains mainly methane and nitrogen and/or ammonia, to which hydrogen may also have been added. The atomic ratio C:N in the gas mixture is preferably less than 2, and better still less than 1.

The process according to the invention is preferably carried out continuously. Fluid bed as well as moving bed processes may be applied, but shaft furnaces also may be used. The process may also suitably take place in rotary tubular furnaces. In many cases, it is advantageous to have the stream of gas moving in the same direction as the stream of the material.

The invention is further illustrated but not limited by the following examples:

EXAMPLE I

A mixture of hydrogen, nitrogen and natural gas in the ratio 1:1:0.075 was passed for 7 hours over 10 grams of technical grade vanadium pentoxide at a temperature of 1050° C. The product obtained had the following analysis:

|   | Percent by weight |
|---|---|
| Vanadium | 77.5 |
| Carbon | 13.8 |
| Nitrogen | 7.2 |
| Oxygen | 0.35 |

EXAMPLE II

A mixture of hydrogen, nitrogen and natural gas in the ratio 1:1:0.2 was passed for 2 hours over 10 grams of technical grade vanadium pentoxide at a temperature of 1050° C. Subsequently, a mixture of hydrogen and nitrogen in the ratio 1:1 was passed over at the same temperature. The product obtained had the following analysis:

|   | Percent by weight |
|---|---|
| Vanadium | 78.0 |
| Carbon | 6.5 |
| Nitrogen | 12.5 |
| Oxygen | 1.6 |

EXAMPLE III

A series of continuous tests was carried out in a heated rotating tube which was titlted at a small angle with the horizontal in order to facilitate the transport of the finely divided material. The material was fed in and removed again continuously. The stream of gas moved in the same direction as the stream of the material. In all tests the material was kept at the reaction temperature for 1¼ hours.

The gas mixtures applied consisted either solely of natural gas and added nitrogen or solely of natural gas and ammonia.

The results are given in the table below:

| Technical grade V₂O₅ fed in per hour, in grams | Natural gas, l./hour | Nitrogen, l./hour | Ammonia, l./hour | Temp., °C. | Analysis, percent | | | |
|---|---|---|---|---|---|---|---|---|
| | | | | | O | V | N | C |
| 12.5 | 29 | 15 | | 1,050 | 0.5 | 76.4 | 4.2 | 18.0 |
| 13 [1] | 60 | 25 | | 975 | 0.6 | 78.7 | 4.3 | 14.9 |
| 12–13 | 32 | 25 | | 1,050 | 1.6 | 77.2 | 6.0 | 14.4 |
| 13.3 | 30 | | 30 | 1,050 | 0.7 | 77.8 | 6.1 | 13.9 |
| 12–13 | 35 | | 30 | 1,000 | 1.1 | 75.5 | 10.0 | 12.0 |
| 12–13 | 44 | | 60 | 950 | 1.4 | 74.2 | 16.2 | 6.7 |

[1] Approximate.

NOTE.—The larger part of the carbon (nearly 5%) was free, i.e. not chemically combined.

EXAMPLE IV

The procedure of Example 2 was repeated and followed by passing pure ammonia for 1 hour at 30 liters per hour. The product obtained had the following analysis:

|  | Percent by weight |
|---|---|
| Vanadium | 77.1 |
| Carbon | 8.1 |
| Nitrogen | 13.7 |
| Oxygen | 1.1 |

EXAMPLE V

The procedure of Example I was repeated using a mixture containing 20 percent by volume of CO and gave substantially similar results.

EXAMPLE VI

The procedure of Example I was repeated starting with ammonium metavanadate instead of $P_2O_5$ and gave substantially the same results.

In the above examples, the natural gas used was obtained from Slochteren and contained about 85% methane and 15% nitrogen.

It will be obvious to those skilled in the art that equivalent materials and conditions may be employed without departing from the concept of the invention, except as defined in the appended claims.

The embodiments of the invention in which an exclusive property or privilege is claimed are defined as follows:

1. Process for the preparation of vanadium carbonitride which comprises initially contacting at a temperature in the range from about 800° C. to 1250° C. an oxidic, vanadium-containing material with a gaseous hydrocarbon containing from one to three carbon atoms and then in succession with a second gas selected from the group consisting of nitrogen, ammonia, and mixtures thereof, the reactants being selected so that the atomic ratio C:N in the contacting gases is less than 2.

2. Process as defined in claim 1 wherein said oxidic vanadium containing material is vanadium pentoxide, wherein the temperature is about 1050° C., wherein said second gas is nitrogen, wherein the time of contacting is about 7 hours, and wherein said gaseous hydrocarbon is natural gas comprising about 85% methane.

3. Process as defined by claim 1 wherein about 12 to 13 grams of vanadium pentoxide/hour is fed, passing thereover about 32 liters/hour of natural gas.

4. Process as defined by claim 1 wherein said oxidic vanadium containing maetrial is vanadium pentoxide, wherein said gaseous hydrocarbon is methane, and wherein said second gas is nitrogen.

5. The process according to claim 1 wherein said contacting is effected at a temperature between 900 and 1100° C.

6. The process according to claim 1, wherein the atomic ratio C:N in the gas mixture is less than 1.

7. Process for the preparation of vanadium carbonitride which comprises initially contacting at a temperature in the range from about 800° C. to 1250° C., an oxidic, vanadium containing material with a gas selected from the class consisting of hydrocarbon containing from one to 3 carbon atoms in the molecule and then in succession with a second gas selected from the class consisting of nitrogen, ammonia and hydrocarbon containing one to three carbon atoms in the molecule and mixtures thereof, the reactants being selected so that the atomic ratio C:N in the contacting gases is less than 2.

References Cited
UNITED STATES PATENTS

| 3,334,992 | 8/1967 | Downing et al. | 23—208 A X |
| 3,342,553 | 9/1967 | Buker et al. | 23—208 A |
| 3,389,957 | 6/1968 | Olds et al. | 23—359 X |
| 3,416,891 | 12/1968 | Roubin et al. | 23—191 |
| 3,492,100 | 1/1970 | Roubin et al. | 23—315 |

OTHER REFERENCES

Rene: Chem. Abst., vol. 71, para. 103673s (1969).

HERBERT T. CARTER, Primary Examiner

U.S. Cl. X.R.

423—409